United States Patent [19]

Kawai

[11] Patent Number: 5,101,944
[45] Date of Patent: Apr. 7, 1992

[54] POSITIONING APPARATUS EMPLOYING A SPRING CLUTCH

[75] Inventor: Nobuyuki Kawai, Toyokawa, Japan

[73] Assignee: Minolta Camera Kabushiki Kaisha, Osaka, Japan

[21] Appl. No.: 585,306

[22] Filed: Sep. 19, 1990

[30] Foreign Application Priority Data

Sep. 22, 1989 [JP] Japan .................. 1-247037

[51] Int. Cl.⁵ .................. F16D 11/02; F16D 67/06
[52] U.S. Cl. .................. 192/12 BA; 74/567; 192/26; 192/33 C
[58] Field of Search .................. 192/26, 33 C, 12 BA; 74/816, 567

[56] References Cited

U.S. PATENT DOCUMENTS

| | | | |
|---|---|---|---|
| 3,337,015 | 8/1967 | Wagner | 192/33 C X |
| 3,376,963 | 4/1968 | Schaeffer | 192/26 X |
| 3,394,785 | 7/1968 | Crutcher et al. | 192/26 X |
| 3,504,572 | 4/1970 | Kim et al. | 74/567 |
| 3,541,883 | 11/1970 | Knight | 74/567 |
| 3,729,077 | 4/1973 | Torigai | 192/26 X |
| 3,812,941 | 5/1974 | Yanagawa | 192/26 |
| 3,985,212 | 10/1976 | Gershnow et al. | 192/33 C X |
| 3,987,880 | 10/1976 | Holland-Letz et al. | 192/26 X |
| 3,998,584 | 12/1976 | Wada et al. | 432/60 |
| 4,191,283 | 3/1980 | Keeny | 192/26 |
| 4,193,483 | 3/1980 | Ariga et al. | 192/26 |
| 4,746,954 | 5/1988 | Matuura et al. | 355/14 DR |

FOREIGN PATENT DOCUMENTS 52-54747 4/1977 Japan .
60-181742 12/1985 Japan .

Primary Examiner—Rodney H. Bonck
Attorney, Agent, or Firm—Willian Brinks Olds Hofer Gilson & Lione

[57] ABSTRACT

Apparatus for positioning a movable member, the apparatus comprising a driving shaft, a driven shaft and a clutch for engaging and disengaging the driving shaft and the driven shaft. The circumferential surface of a cam fixed around the driven shaft has such a specified angle of an arc whose center is the axis of the driven shaft that the movable member is prevented from shifting the position due to inertia rotation of the cam and the driven shaft.

15 Claims, 7 Drawing Sheets

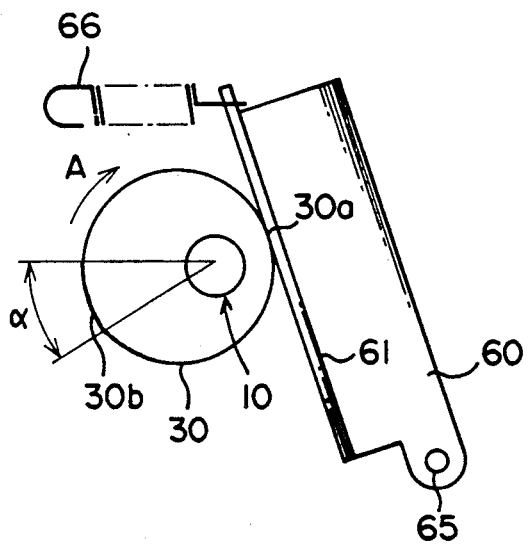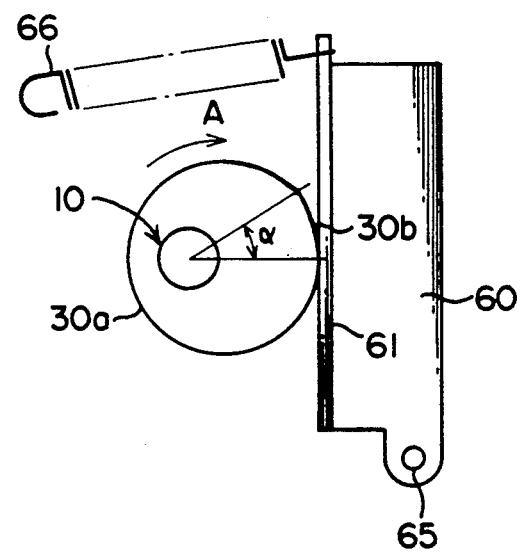

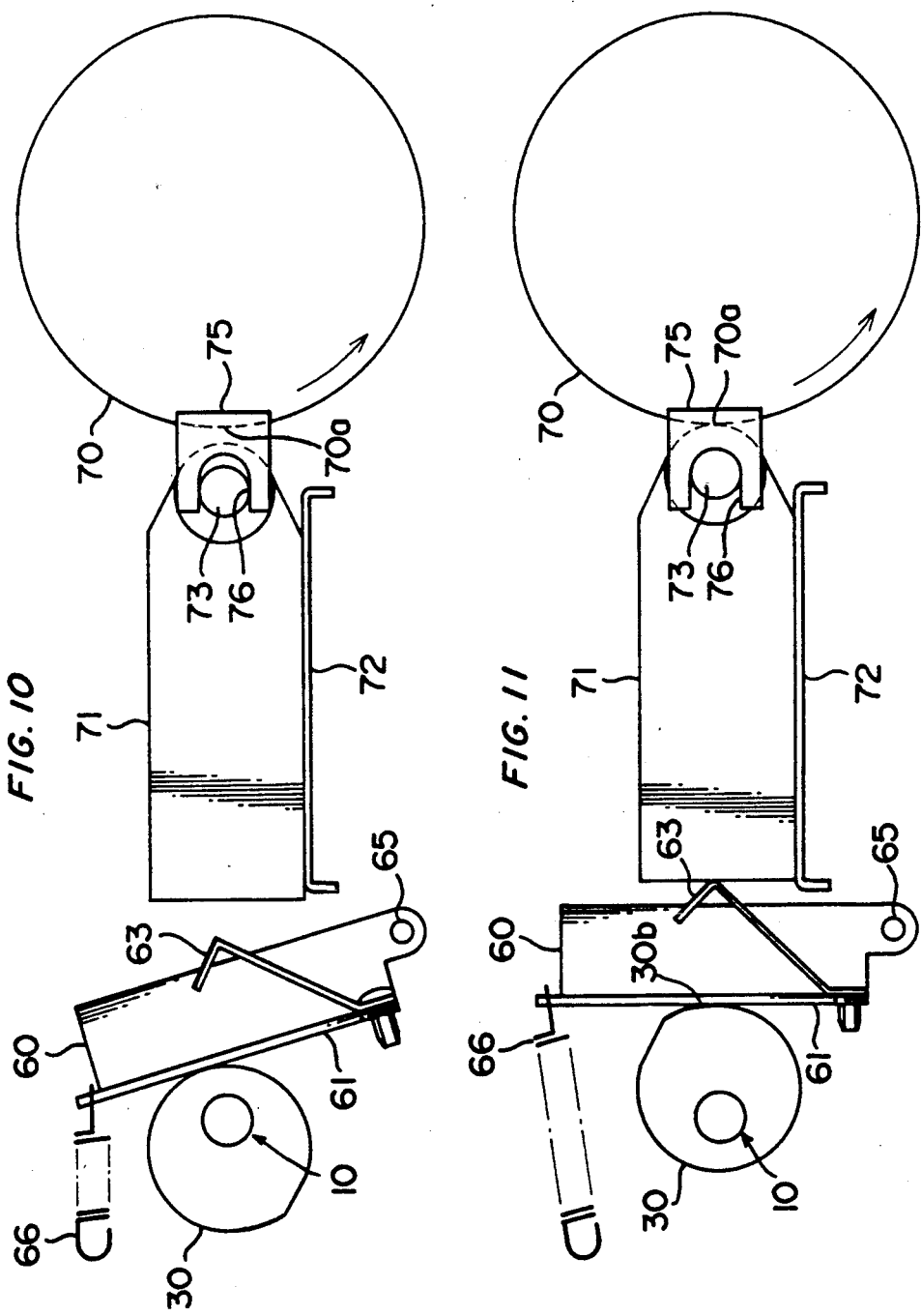

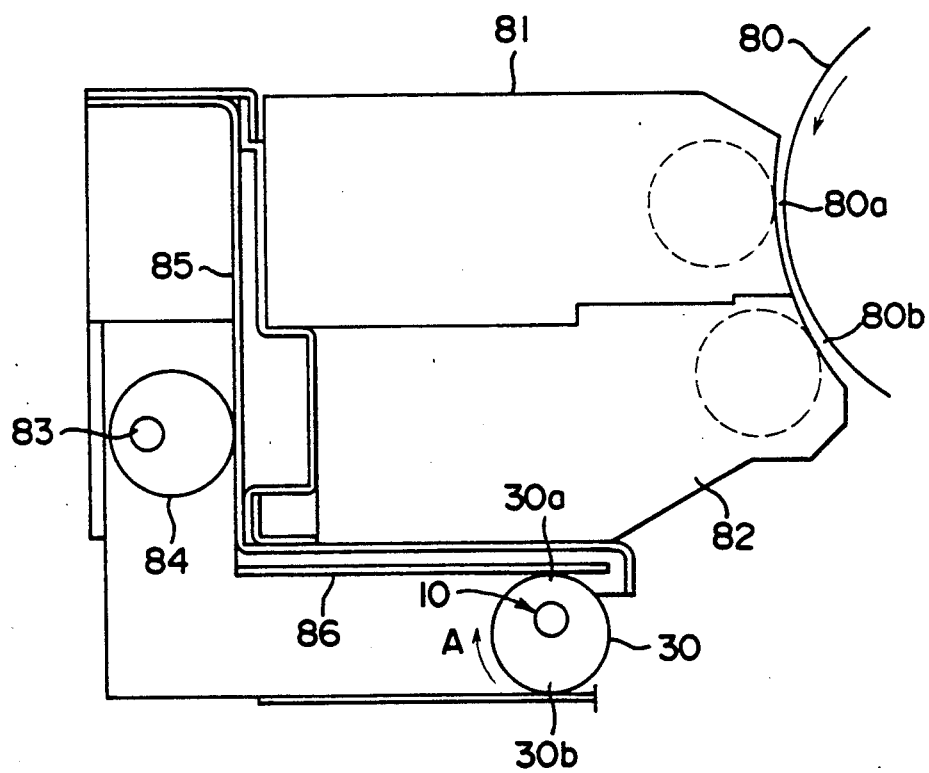

POSITIONING APPARATUS EMPLOYING A SPRING CLUTCH

BACKGROUND OF THE INVENTION

1. Field of the Invention

The present invention relates to positioning apparatus, and more specifically apparatus wherein a rotating force is transmitted from a driving side clutch shaft to a driven side clutch shaft via a coil spring wrapped around the both clutch shafts, and a cam member fitted around the driven side clutch shaft puts a movable member leaning against the cam member in a specified position.

2. Description of Related Art

In a conventional spring clutch, a coil spring is wrapped around a driving side clutch shaft connected to a drive source and a driven side clutch shaft, and a rotating force is transmitted from the driving side clutch shaft to the driven side clutch shaft by tightening the coil spring. Also, the spring loosens when the rotation of the spring is inhibited, whereby the transmission of the rotating force to the driven side clutch shaft is discontinued.

In this type of spring clutch, however, when the transmission of the rotating force is discontinued by inhibiting the rotation of the coil spring, the driven side clutch shaft does not stop rotating immediately and continues rotating by a slight angle because of inertia, that is, overruns. Then, a cam member fitted around the driven side clutch shaft overruns, and a movable member to be positioned by the cam member is not put in place accurately.

SUMMARY OF THE INVENTION

It is therefore an object of the Present invention to Provide positioning apparatus employing a spring clutch wherein a cam member fitted around a driven shaft positions a movable member accurately.

In order to attain the object, positioning apparatus according to the present invention comprises a cam member which has a circumferential surface having a specified angle of an arc whose center is the axis of the driven shaft. The specified angle means an angle by which the driven shaft rotates because of inertia after the clutch was disengaged. With this arrangement, even when the driven shaft overruns after discontinuance of the transmission of a rotating force, a movable member is positioned accurately by the arc portion of the cam member.

The positioning apparatus according to the present invention further comprises means for stopping the driven shaft from rotating when or immediately after the clutch is disengaged. This rotation stopping means, for example, consists of a ratchet or a protrusion formed on the driven shaft and a claw to engage with the ratchet or the protrusion. The claw comes into engagement with the ratchet or the protrusion immediately after the clutch is disengaged so that the driven shaft is prevented from overrunning due to inertia.

DESCRIPTION OF THE DRAWINGS

This and other objects and features of the present invention will become apparent from the following description taken in conjunction with the preferred embodiments thereof with reference to the accompanying drawings.

FIGS. 1 through 9 show a first embodiment of the present invention.

FIG. 1 is a vertical sectional view of positioning apparatus according to the present invention;

FIG. 2 is a perspective view of a coil spring;

FIG. 3 is a front view of the positioning apparatus;

FIGS. 4 and 5 are views of switching means showing the motion thereof;

FIGS. 6 and 7 are views of rotation stopping means showing the motion thereof;

FIGS. 8 and 9 are views of an eccentric cam showing the motion thereof;

FIGS. 10 and 11 are views of an example of applying the positioning apparatus according to the first embodiment to a mechanism for positioning developing devices;

FIG. 12 is a front view of another example of applying the positioning apparatus according to the first embodiment to a positioning mechanism;

DETAILED DESCRIPTION OF THE PREFERRED EMBODIMENTS

The description of positioning apparatus embodying the principles and features of the present invention is hereinafter given in reference to the accompanying drawings. In all the drawings, the common parts and components are numbered the same.

First Embodiment

Figure 1:
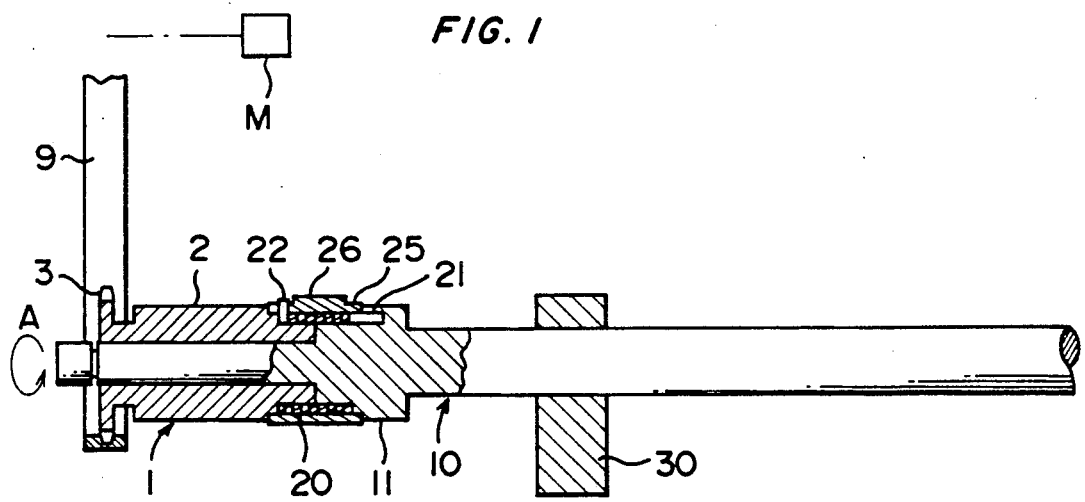
Figure 2:
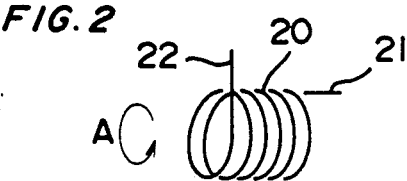
Figure 3:
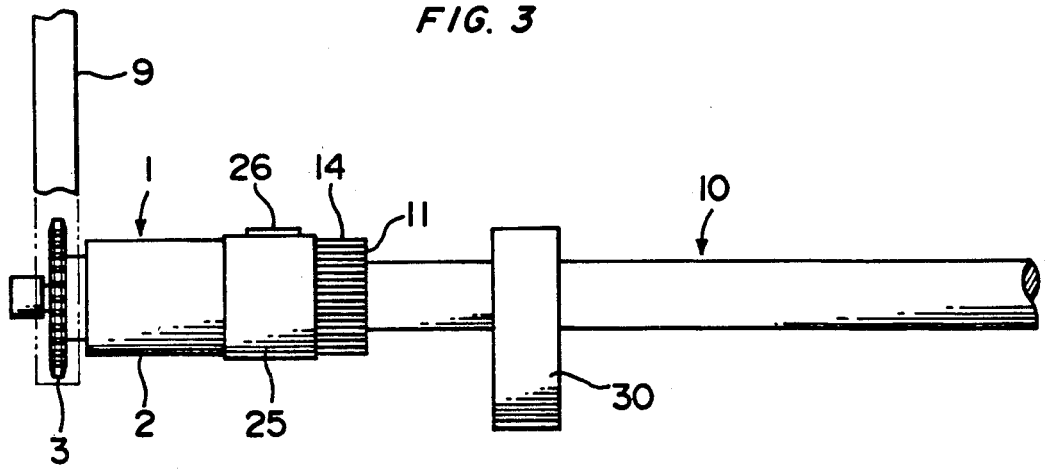

FIGS. 1 through 9 show first exemplary positioning apparatus. The positioning apparatus, as shown in FIGS. 1, 2 and 3, mainly comprises a driving side clutch shaft 1, a driven side clutch shaft 10, a coil spring 20, a collar 25 and an eccentric cam 30.

The driving side clutch shaft 1, which includes a boss 2 and a sprocket wheel 3, is rotatably fitted around the driven side clutch shaft 10. A chain 9, which is driven by a motor M, engages with the sprocket wheel 3, and the chain 9 transmits a rotating force in the direction indicated by the arrow (A) to the driving side clutch shaft 1 all the time.

The driven side clutch shaft 10 has a boss 11, and the edges of the clutch shaft 10 is so fitted on a frame (not shown) that the clutch shaft 10 is rotatably supported. The boss 11 is formed into a ratchet 14 on the circumference.

The coil spring 20 spirals around the bosses 2 and 11 of the respective clutch shafts 1 and 10, and the wrapping direction of the spring 20 is reverse to the rotating direction of the clutch shafts 1 and 10 indicated by the arrow (A). An end portion 21 of the spring 20 engages with a groove formed in the boss 11 of the driven side clutch shaft 10 so that the spring 20 is capable of rotating with the driven side clutch shaft 10. The other end portion 22 of the spring 20 engages with a groove formed in the collar 25 so that the spring 20 is capable of rotating with the collar 25. However, the spring 20 is free from the rotation of i.e., not attached to the driving side clutch shaft 1. The collar 25 is cylindrical and covers the spring 20. The collar 25 has a protrusion 26 on the circumference, the protrusion 26 acting as a means of engaging and disengaging the clutch.

The eccentric cam 30 is fixed around the driven side clutch shaft 10, and it determines the position of a movable board 60 shown in FIGS. 8 and 9. The configuration of the eccentric cam 30 will be described later.

Figure 4:
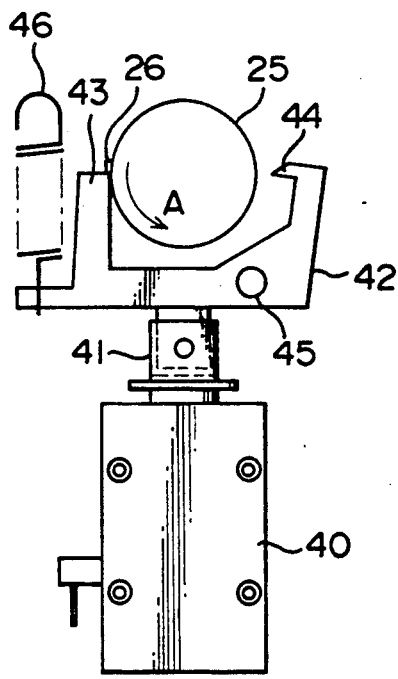
Figure 5:
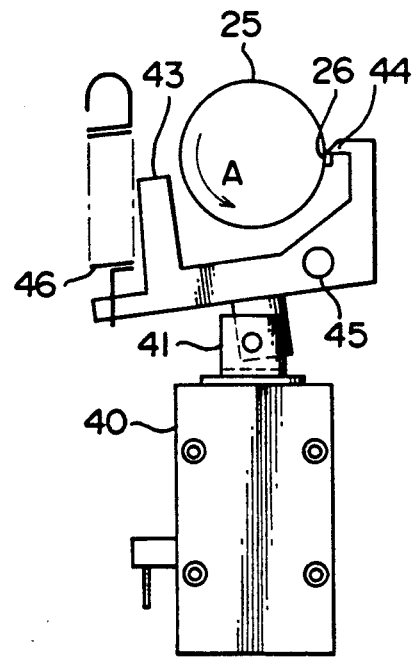
Figure 6:
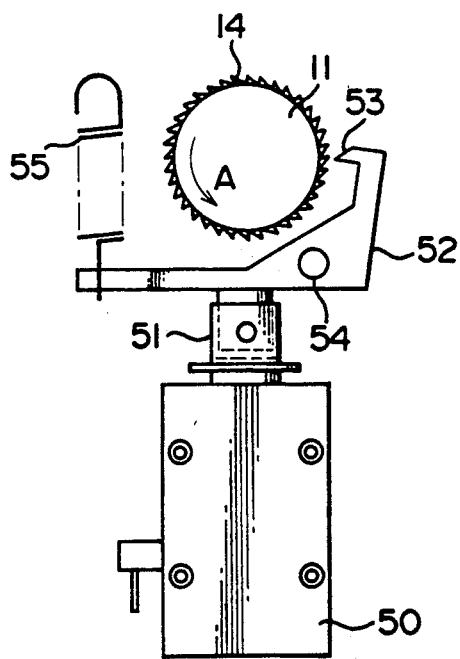
Figure 7:
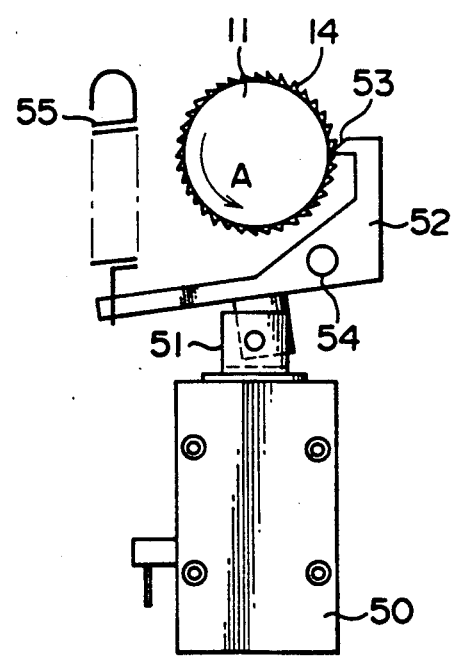

In this first embodiment, a change lever 42 which is driven by a solenoid 40 shown in FIGS. 4 and 5 acts as a means of switching the operation of the coil spring 20. Further, in order to stop the driven side clutch shaft 10 from rotating due to inertia, a stop lever 52 which is driven by a solenoid 50 is provided. The change lever 42 has two claws 43 and 44 which are opposite each other, and the lever 42 is pivoted on a shaft 45. Also, the lever 42 is connected to a plunger 41 of the solenoid 40 and urged in the clockwise direction by a spring 46 at all times. The change lever 42 is put in position as shown in either FIG. 4 or FIG. 5 according to the on or off state of the solenoid 40. When the protrusion 26 of the collar 25 comes into engagement with either the claw 43 or 44 the collar 25 is prevented from rotating in the direction of the arrow (A). The respective points where the protrusion 26 comes into engagement with the claws 43 and 44 are located at an angle of 180° relative to the axis of the spring clutch. The stop lever 52 has a claw 53, and the lever 52 is pivoted on a shaft 54. The lever 52 is connected to a plunger 51 of the solenoid 50 and urged in the clockwise direction by a spring 55 at all times. While the solenoid 50 is off, the stop lever 52 stays in a position as shown in FIG. 6, so that the claw 53 keeps away from the ratchet 14 on the boss 11 of the driven side clutch shaft 10. When the solenoid 50 is turned on, as shown in FIG. 7, the claw 53 comes into engagement with the ratchet 14, whereby the driven side clutch shaft 10 is stopped from rotating.

The operation of the positioning apparatus which has the composition above is hereinafter described.

The driving side clutch shaft 1 is provided with a rotating force by the chain 9 and rotated in the direction of the arrow (A) all the time. While none of the claws 43 and 44 of the change lever 42 engages with the protrusion 26, that is, while the collar 25 is free, the end portion 22 of the coil spring 20 attached to collar 25 is also free. Hence, the spring 20 tightens around the bosses 2 and 11, of shaft 1 and 10, respectively and the rotation of the driving side clutch shaft 1 is transmitted to the driven side clutch shaft 10 by the tightened spring. In this moment, the spring 20, the collar 25, the eccentric cam 30 rotate in the direction of the arrow (A) together with the driven side clutch shaft 10.

The solenoids 40 and 50 are usually off (see FIGS. 4 and 6). In this state, the claw 43 of the change lever 42 slips on the collar 25, and when the protrusion 26 comes into engagement with the claw 43 as illustrated by the arrow (A), the collar 25 and the spring 20 are stopped from rotating in the direction of the arrow (A). Then, the rotation of the driving side clutch shaft 1 gives the spring 20 a force in the unwrapping direction, loosening the spring 20. Thereby, the driving side clutch shaft 1 idles in the direction of the arrow (A), and the driven side clutch shaft 10 is kept in a stop state. In this state, as shown in FIG. 8, a point 30a on the cam 30 which is the circumferential point closest to the axis of the driven side clutch shaft 10 is the contact point between the cam 30 and the movable board 60. In other words, the movable board 60, which is urged to pivot counterclockwise on the shaft 65 by the spring 66, is Propped by the cam 30 at the point 30a, and thereby the board 60 is kept in place as shown in FIG. 8.

When a clutch-on signal is generated from a control section (not shown), the solenoid 40 is turned on, and the change lever 42 slightly pivots counterclockwise on the shaft 45. Thereby, the protrusion 26 is disengaged from the claw 43, the collar 25 becomes free, and the coil spring 20 compresses the bosses 2 and 11. Then, as described above, the rotation of the driving side clutch shaft 1 is transmitted to the driven side clutch shaft 10 via the spring 20. Thus, the coil spring 20, the collar 25 and the eccentric cam 30 rotate in the direction of the arrow (A) with the driven side clutch shaft 10. When these parts make a 180° turn, as shown in FIG. 5, the protrusion 26 comes into engagement with the claw 44, and the collar 25 and the spring 20 are stopped from rotating. At the same time, the spring 20 loosens, and the transmission of the rotating force to the driven side clutch shaft 10 is discontinued. As the eccentric cam 30 is making a 180° turn, its arc portion 30b which has a larger radius comes to the movable board 60, and thereby the board 60 pivots clockwise to be in the vertical posture (see FIG. 9).

Even after the protrusion 26 came into engagement with the claw 44, the driven side clutch shaft 10 and the eccentric cam 30 rotate in the direction of the arrow (A) because of inertia. Such overrunning due to the inertia impairs the accuracy of positioning the movable board 60. In this first embodiment, therefore, immediately after the transmission of the rotating force to the driven side clutch shaft 10 was discontinued by the engagement of the protrusion 26 with the claw 44, the solenoid 50 is turned on. Thereby, the stop lever 52 pivots counterclockwise on the shaft 54, and the claw 53 comes into engagement with the ratchet 14 to stop the driven side clutch shaft 10 from rotating see FIG. 7).

However, the driven side clutch shaft 10 and the eccentric cam 30 still rotate in the direction of the arrow (A) due to the inertia for the time lag between the engagement of the protrusion 26 with the claw 44 and the engagement of the claw 53 with the ratchet 14. In order to cover the lag as much as possible, provided is the arc portion 30b whose central angle is ($\alpha$) and whose center is the pivot of the eccentric cam 30. The angle ($\alpha$) corresponds to an angle by which the driven side clutch shaft 10 rotates due to the inertia after the transmission of the rotating force to the driven side clutch shaft 10 was discontinued until the clutch shaft 10 is forced to stop rotating by the stop lever 52, with a little allowance. With this arrangement, when disengaging the clutch, the positioning of the movable board 60 by the eccentric cam 30 becomes accurate.

When returning the movable board 60 to the initial position, the solenoid 40 is turned off Thereby, the claw 44 retreats from the protrusion 26, and the clutch is engaged again. Also, the solenoid 50 should be turned off to disengage the claw 53 from the ratchet 14 immediately before the solenoid 40 is turned off. Accordingly, the driven side clutch shaft 10, the eccentric cam 30, the coil spring 20 and the collar 25 rotate in the direction of the arrow (A) until the protrusion 26 comes into engagement with the claw 43. Thus, these parts are back into the state as shown in FIGS. 4 and 8.

The purpose of turning off the solenoid 50 immediately before turning off the solenoid 40 is to prevent a damage of the stop lever 52.

FIGS. 10 and 11 show examples of applying the positioning apparatus described in this first embodiment to a copying machine or a printer as a mechanism for positioning developing devices. A plurality of developing devices (only one of them is illustrated in FIGS. 10 and 11) are disposed opposite the photosensitive drum 70, and one of the developing devices 71 is to be positioned in a developing area 70a. FIG. 10 shows a state where the developing device 71 recedes from the developing area 70a, and FIG. 11 shows a state where the developing device 71 is in the developing area 70a. The developing device 71 is slidably mounted on a base plate 72 and urged backward (to the left in FIGS. 10 and 11), and at each side of the edge portion, a roller 73 is disposed. Each of the rollers 73 engages with a guide groove 76 of a guide plate 75 to regulate the position of the developing device 71. At the backside of the developing device 71, the movable board 60 and the eccentric cam 30 are set, and a spring plate 63 is attached to the board 60 with screws.

While the solenoid 40 is off, and the spring clutch is in a state as shown in FIGS. 4 and 8, the spring plate 63 is away from the developing device 71. When the solenoid 40 is turned on, and the driven side clutch shaft 10 and the eccentric cam 30 rotate by 180°, the larger radius arc portion 30b of the cam 30 comes to the board 60, so that the board 60 is put in the vertical posture. At the same time, the spring plate 63 pushes the developing device 71 on the back to set the developing device 71 to the developing area 70a. When the solenoid 40 is turned off, the developing device 71 returns to the position as shown in FIG. 10. In order to assure the accuracy of positioning the movable board 60 by means of the eccentric cam 30, the solenoid 50 is also turned on and off at specified times.

FIG. 12 shows another example of utilizing the positioning apparatus described in the first embodiment as a mechanism for positioning developing devices. Developing devices 81 and 82 are integrally supported by frames 85 and 86, and they are capable of pivoting on a shaft 83 in a body. The positioning of the developing devices 81 and 82 is performed by the eccentric cam 30 disposed immediately below the frame 86. As the eccentric cam 30 is rotating intermittently by the 180° as described above, the developing devices 81 and 82 pivot upward and downward on the shaft 83. Specifically, when the frame 86 is regulated by the eccentric cam 30 on the point 30a, the upper developing device 81 is in a first developing area 80a, while the lower developing device 82 recedes from a second developing area 80b. When the eccentric cam 30 rotates in the direction of the arrow (A) by 180° from the position shown in FIG. 12, and the larger radius arc portion 30b comes to the frame 86, the developing devices 81 and 82 pivot on the shaft 83 upward in a body. Consequently, the upper developing device 81 recedes from the first developing area 80a, while the lower developing device 82 is positioned in the second developing area 80b.

Further, a cam 84 fixed on the shaft 83 functions to separate the developing devices 81 and 82 in a body from the photosensitive drum 80 at a time of maintenance of the photosensitive drum 80.

The composition of the developing devices 81 and 82 is disclosed in U.S. Pat. No. 4,746,954.

Second Embodiment

Figure 13:
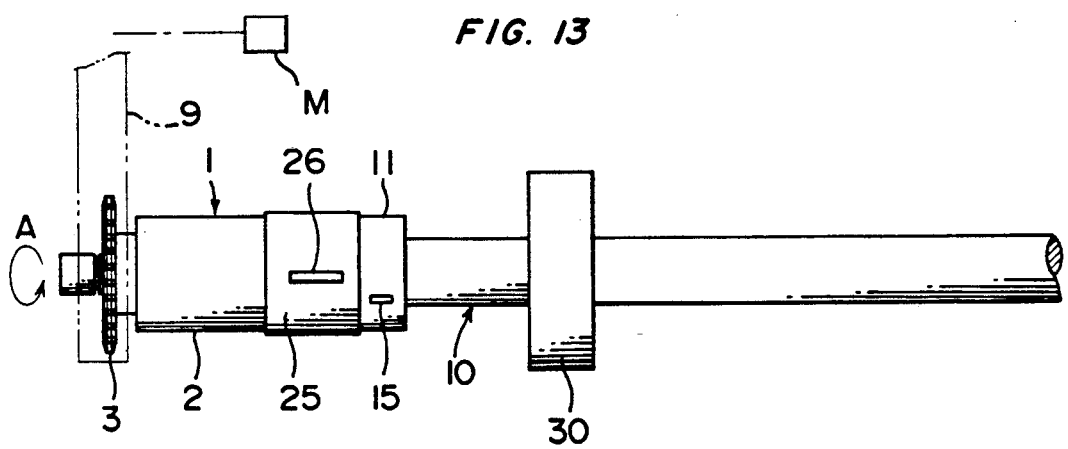
FIG. 13 is a front view of positioning apparatus according to a second embodiment of the present invention.
Figure 14:
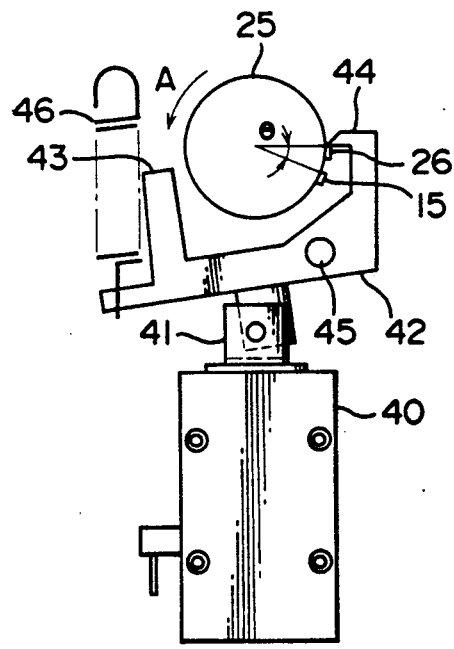
FIG. 14 is a view of switching means and rotation stopping means according to the second embodiment showing the motion thereof.

FIGS. 13 and 14 show second exemplary positioning apparatus embodying the principles and features of the present invention. In this embodiment, as a means of stopping the driven side clutch shaft 10 from rotating, that is, as a counterpart of the ratchet 14 in the first embodiment, a protrusion 15 is formed on the circumference of the boss 11 of the driven side clutch shaft 10. The claws 43 and 44 of the change lever 42 driven by the solenoid 40 are made so wide that the claws 43 and 44 can engage with the rotation stop protrusion 15 as well as the protrusion 26 on the collar 25. Accordingly, in this second embodiment, the stop lever 52 and the solenoid 50 are not provided. The positioning apparatus of this second embodiment has the same composition as that of the first embodiment except for the above-described points.

In this second embodiment, the protrusions 26 and 15 are disposed away from each other at an angle of ($\theta$). The solenoid 40 is turned on, and when the collar 25, the driven side clutch shaft 10 and the eccentric cam 30 make a 180° turn in the direction of (A) in a body, first the protrusion 26 comes into engagement with the claw 44, and the rotation of the collar 25 is stopped, that is, the clutch is disengaged. Thereafter, the driven side clutch shaft 10 and the eccentric cam 30 still rotate by angle ($\theta$) because of inertia, and the protrusion 15 comes into engagement with the claw 44, thereby stopping the rotation. With this arrangement, overrunning of the driven side clutch shaft 10 and the eccentric cam 30 due to the inertia is only rotation by angle ($\theta$), and hence an error in positioning with use of the eccentric cam 30 is extremely small. In order to make the error zero, the eccentric cam 30 is to be so made that it has an arc portion whose center is the pivot of the cam 30 and whose central angle is (60), as shown in FIGS. 8 and 9. In this case, preferably the angle ($\alpha$) is slightly larger than the angle ($\theta$).

Third Embodiment

Figure 15:
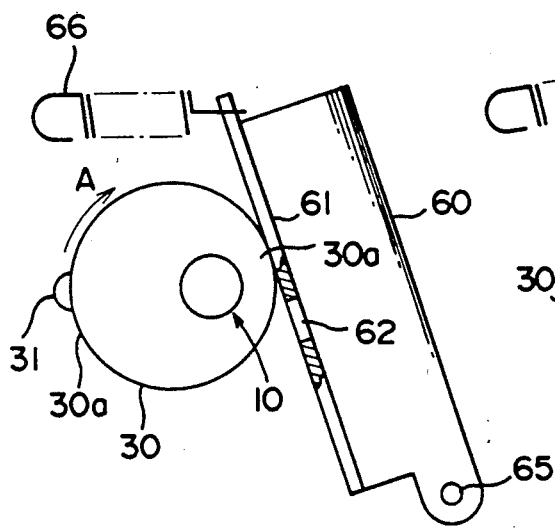
FIG. 15 and 16 are views of an eccentric cam according to a third embodiment of the present invention showing the motion thereof.
Figure 16:
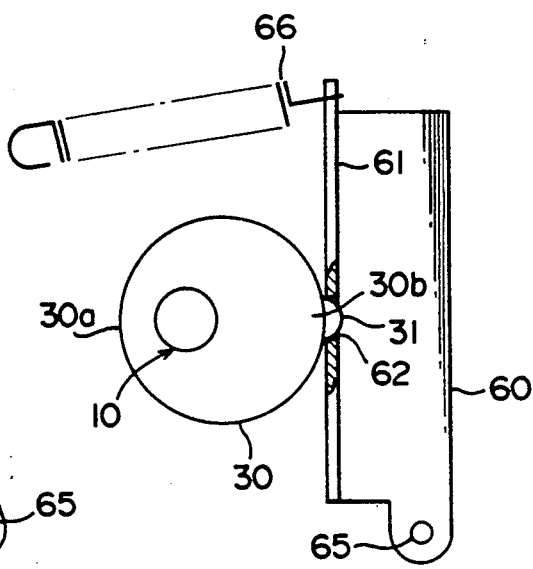

FIGS. 15 and 16 show third exemplary positioning apparatus embodying the principles and features of the present invention. In this embodiment, a protrusion 31 is formed on the eccentric cam 30 on a point 30b which is the farthest from the pivot of the cam 30, and a hole 62 is formed on the side 61 of the movable board 60. The clutch is engaged, and when the eccentric cam 30 makes a 180° turn in the direction of the arrow (A) from the position indicated in FIG. 15, the clutch is disengaged, and the protrusion 31 enters the hole 62 of the movable board 60. Thereby, rotation of the driven side clutch shaft 10 and the eccentric cam 30 due to the inertia is inhibited, and thus the movable board 60 can be positioned accurately regulated by the point 30b of the eccentric cam 30.

Further, the solenoid 50, the stop lever 52 and the ratchet 14 are not provided in this third embodiment. The positioning apparatus of this third embodiment has the same composition as that of the first embodiment except for the above-described points.

Fourth Embodiment

According to the present invention, as long as the eccentric cam 30 has an arc portion 30b whose center is the pivot of the cam 30 as shown in FIGS. 8 and 9, it is not necessary to provide a mechanism for preventing the driven side clutch shaft 10 from rotating due to inertia. In this case, the central angle ($\alpha$) of the arc portion 30b is to correspond to an angle by which the driven side clutch shaft 10 and the eccentric cam 30 rotate because of the inertia after the clutch was disengaged, with a little allowance.

Figure 17:
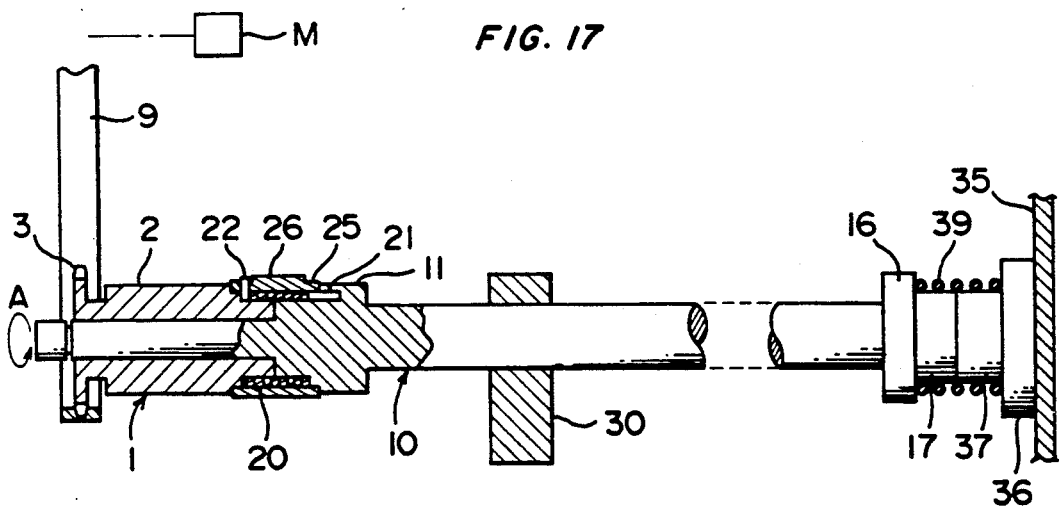
FIG. 17 is a vertical sectional view of positioning apparatus according to a fourth embodiment.

Further, in a case that only the configuration of the eccentric cam 30 contributes to the accuracy in positioning, it is preferable that a specified load is imposed on the driven side clutch shaft 10 beforehand in order to obstruct inertia rotation of the driven side clutch shaft 10 and the eccentric cam 30. Specifically, referring to FIG. 17, a shaft 17 having a flange 16 is fixed on the driven side clutch shaft 10 at the end, and a shaft 37 having a flange 36 is fixed on a frame 35. Then, a coil spring 39 is wrapped around the shafts 17 and 37. The coil spring 39 applied the brakes to the shaft 17 all the time, and when the clutch is disengaged, the angle of inertia rotation of the driven side clutch shaft 10 becomes smaller.

Although the present invention has been described in connection with the embodiments above, it is to be noted that various changes and modifications are apparent to those who are skilled in the art. Such changes and modifications are to be understood as included within the scope of the present invention defined by the appended claims, unless being separated therefrom.

For example, the change lever 42 for engaging and disengaging the clutch and the stop lever 52 for stopping inertia rotation of the driven side clutch shaft 10 may be made into various configurations. Also, it is preferable for abrasion resistance that a washer or the like is disposed at a place where the coil spring 20 is fitted. Further, as a means of applying the brakes to the driven side clutch shaft 10, any member having a large friction coefficient as well as the spring 39 shown in FIG. 17 may be used.

What is claimed is:

1. Apparatus for positioning a movable member, the apparatus comprising:
   a driving shaft to be connected with a drive source;
   a driven shaft disposed around the same axis as the driving shaft;
   clutch means for engaging and disengaging the driving shaft and the driven shaft;
   a cam member rotatably fixed around the driven shaft against which the movable member leans, the cam member having a circumferential surface having an arc portion whose center is the axis of the driven shaft; and
   switching means for switching the clutch means to disengage the clutch means between the driving shaft and the driven shaft so that the cam member is stopped from rotating, the central angle of the arc portion being such that the cam member is stopped from rotating in a state that the arc portion is in contact with the movable member notwithstanding any further rotation of the cam member by inertia after disengagement of the clutch means between the driving shaft and the driven shaft whereby the position of the movable member does not change due to any such further rotation.

2. Apparatus as claimed in claim 1, wherein
   the clutch means includes a coil spring wrapped around the driving shaft and the driven shaft, the coil spring having an end portion connected to the driven shaft and the other end portion connected to a collar; and
   the switching means includes an engaging member for releasing the driving shaft from the compression of the coil spring by engaging with the other end portion of the coil spring and for permitting the compression of the coil spring on the driving shaft by disengaging the other end portion of the coil spring, and a driving member for moving the engaging member to engage with and disengage from the other end portion of the coil spring.

3. Apparatus as claimed in claim 1, further comprising means for applying brake force to the driven shaft in order to reduce further rotation thereof caused by inertia.

4. Apparatus as claimed in claim 1, further comprising means for stopping the driven shaft from rotating when or immediately after the switching means disengages the clutch means between the driving shaft and the driven shaft.

5. Apparatus as claimed in claim 4, wherein the rotation stopping means includes a ratchet formed on the driven shaft and a claw to engage with the ratchet.

6. Apparatus as claimed in claim 4, wherein the rotation stopping means includes a protrusion formed on the driven shaft and a claw to engage with the protrusion.

7. Apparatus as claimed in claim 6, wherein a solenoid and a claw member are used commonly as the switching means and as the rotation stopping means.

8. Apparatus as claimed in claim 6, wherein the clutch means includes a coil spring wrapped around the driving shaft and the driven shaft, the coil spring having an end portion connected to the driven shaft and the other end portion connected to a collar;
   the switching means includes an engaging member for releasing the driving shaft from the compression of the coil spring by engaging with the other end portion of the coil spring and for permitting the compression of the coil spring on the driving shaft by disengaging the other end portion of the coil spring, and a driving member for moving the engaging member to engage with and disengage from the other end portion of the coil spring;
   the protrusion on the driven shaft is located at an upstream side of a protrusion on said collar by a specified angle in relation to the rotating direction of the shafts; and
   the central angle of the arc portion of the cam member is larger than the angle between the protrusion on the driven shaft and the protrusion on said collar.

9. Apparatus as claimed in claim 1, wherein
   the clutch means includes a coil spring tightly wrapped around the driving shaft and the driven shaft; and
   the switching means switches the clutch means by releasing the driving shaft from the compression of the coil spring.

10. Apparatus for positioning a movable member, the apparatus comprising:
    a driving shaft to be connected with a drive source;
    a driven shaft disposed around the same axis as the driving shaft;
    clutch means for engaging and disengaging the driving shaft and the driven shaft;
    a cam member rotatably fixed around the driven shaft against which the movable member leans;
    switching means for switching the clutch means to disengage the clutch means between the driving shaft and the driven shaft; and
    rotation stopping means for stopping the driven shaft from rotating when the switching means disengages the clutch means between the driving shaft and the driven shaft, the rotation stopping means including a protrusion formed on the cam member and a concavity which is formed on the movable member leaning against the cam member to engage with the protrusion.

11. Apparatus as claimed in claim 10, wherein the clutch means includes a coil spring wrapped around the driving shaft and the driven shaft, the coil spring having an end portion connected to the driven shaft and the other end portion connected to a collar; and the switching means includes an engaging member for releasing the driving shaft from the compression of the coil spring by engaging with the other end portion of the coil spring and for permitting the compression of the coil spring on the driving shaft by disengaging the other end portion of the coil spring, and a driving member for moving the engaging member to engage with an disengage from the other end portion of the coil spring.

12. Apparatus as claimed in claim 10, wherein the clutch means includes a coil spring tightly wrapped around the driving shaft and the driven shaft; and the switching means switches the clutch means by releasing the driving shaft from the compression of the coil spring.

13. Apparatus for positioning a movable member, the apparatus comprising:

a driving shaft to be connected with a drive source;

a driven shaft disposed around the same axis as the driving shaft;

clutch means for engaging and disengaging the driving shaft and the driven shaft;

a cam member rotatably fixed around the driven shaft against which the movable member leans;

switching means for switching the clutch means to disengage the clutch means between the driving shaft and the driven shaft; and rotation stopping means for stopping the driven shaft from rotating when the switching means disengages the clutch means between the driving shaft and the driven shaft, the rotation stopping means including a protrusion formed on one of the cam member and the movable member and a concavity formed on the other of the cam member and movable member to engage with the protrusion.

14. Apparatus as claimed in claim 13, wherein the clutch means includes a coil spring wrapped around the driving shaft and the driven shaft, the coil spring having an end portion connected to the driven shaft and the other end portion connected to a collar; and the switching means includes an engaging member for releasing the driving shaft from the compression of the coil spring by engaging with the other end portion of the coil spring and for permitting the compression of the coil spring on the driving shaft by disengaging the other end portion of the coil spring, and a driving member for moving the engaging member to engage with and disengage from the other end portion of the coil spring.

15. Apparatus as claimed in claim 13, wherein the clutch means includes a coil spring tightly wrapped around the driving shaft and the driven shaft; and the switching means switches the clutch means by releasing the driving shaft from the compression of the coil spring.

* * * * *

UNITED STATES PATENT AND TRADEMARK OFFICE
CERTIFICATE OF CORRECTION

PATENT NO. : 5,101,944
DATED : April 7, 1992
INVENTOR(S) : Nobuyuki Kawai

It is certified that error appears in the above-identified patent and that said Letters Patent is hereby corrected as shown below:

In col. 1, line 37, change "Present" to --present--.

In col. 1, line 38, change "Provide" to --provide--.

In col. 3, line 48, change "shaft 1 and 10" to --shafts 1 and 10--.

In col. 4, line 2, change "Propped" to --propped--.

In col. 4, line 56, after "off" insert --.-- (period).

In col. 5, line 47, change "Is" to --is--.

In col. 6, line 33, change "(60)" to -- ($\alpha$)--.

In col. 7, line 13, change "applied" to --applies--.

In col. 9, line 17 (claim 11, line 12), after "disengaging" insert --from--.

UNITED STATES PATENT AND TRADEMARK OFFICE
CERTIFICATE OF CORRECTION

PATENT NO. : 5,101,944

DATED : April 7, 1992

INVENTOR(S) : Nobuyuki Kawai

It is certified that error appears in the above-identified patent and that said Letters Patent is hereby corrected as shown below:

In col. 9, line 19 (claim 11, line 14), change "an" to --and--.

In col. 10, line 25 (claim 14, line 12) after "disengaging" insert --from--.

Signed and Sealed this

Twenty-second Day of June, 1993

Attest:

MICHAEL K. KIRK

*Attesting Officer*    *Acting Commissioner of Patents and Trademarks*